US012686222B2

(12) United States Patent
Kostenbader

(10) Patent No.: US 12,686,222 B2
(45) Date of Patent: Jul. 21, 2026

(54) NUMBERING UNIT WITH UNIVERSAL LOWER PART FOR VERTICAL AND HORIZONTAL NUMBERING UNITS

(71) Applicant: Zeiser GmbH, Emmingen-Liptingen (DE)

(72) Inventor: Oliver Kostenbader, Tuttlingen (DE)

(73) Assignee: ZEISERGMBH, Emmingen-Liptingen (DE)

( * ) Notice: Subject to any disclaimer, the term of this patent is extended or adjusted under 35 U.S.C. 154(b) by 134 days.

(21) Appl. No.: 18/044,319

(22) PCT Filed: Sep. 10, 2021

(86) PCT No.: PCT/DE2021/100751

§ 371 (c)(1), (2) Date: May 10, 2024

(87) PCT Pub. No.: WO2022/053110

PCT Pub. Date: Mar. 17, 2022

(65) Prior Publication Data

US 2024/0286424 A1 Aug. 29, 2024

(30) Foreign Application Priority Data

Sep. 10, 2020 (DE) ..................... 10 2020 123 681.6

(51) Int. Cl.
*B41K 3/12* (2006.01)
*B41F 13/00* (2006.01)

(52) U.S. Cl.
CPC .......... *B41K 3/126* (2013.01); *B41F 13/0032* (2013.01)

(58) Field of Classification Search
CPC .......... B41K 3/126; B41K 3/12; B41K 3/121; B41F 13/0032; B41F 17/008; B41F 1/565; B41F 3/86
See application file for complete search history.

(56) References Cited

U.S. PATENT DOCUMENTS

| | | | | | |
|---|---|---|---|---|---|
| 3,377,948 | A * | 4/1968 | Giori | G06M 3/12 | 101/247 |
| 5,660,106 | A * | 8/1997 | Pitz | B41K 3/123 | 101/99 |
| 2009/0235832 | A1* | 9/2009 | Wursch | B41K 3/127 | 101/110 |
| 2010/0000427 | A1* | 1/2010 | Wursch | B41F 33/009 | 101/76 |
| 2010/0005983 | A1* | 1/2010 | Diederichs | B41F 33/009 | 101/93.01 |

FOREIGN PATENT DOCUMENTS

| | | | |
|---|---|---|---|
| DE | 29501349 | U1 | 4/1996 |
| DE | 4446273 | A1 | 6/1996 |

(Continued)

OTHER PUBLICATIONS

EPO Machine Translation of DE-102013227140-A1 (Year: 2015).*

*Primary Examiner* — Stephen D Meier
*Assistant Examiner* — Quang X Nguyen
(74) *Attorney, Agent, or Firm* — Slater Matsil, LLP

(57) ABSTRACT

In an embodiment a numbering unit includes an upper part and a universal lower part configured to receive both an upper part of a vertical numbering unit and an upper part of a horizontal numbering unit.

19 Claims, 4 Drawing Sheets

(56) References Cited

FOREIGN PATENT DOCUMENTS

| | | | |
|---|---|---|---|
| DE | 102006052183 | A1 | 5/2008 |
| DE | 102011100847 | A1 | 11/2012 |
| DE | 102013227140 | A1 | 6/2015 |
| EP | 2657022 | A1 | 5/1988 |
| EP | 0718112 | A1 | 6/1996 |
| GB | 743303 | A | 1/1956 |
| JP | S4935887 | B1 | 9/1974 |
| JP | 2005535472 | A | 11/2005 |
| JP | 2009541085 | A | 11/2009 |
| WO | 2004016433 | A1 | 2/2004 |
| WO | 2007148288 | A2 | 12/2007 |

* cited by examiner

NUMBERING UNIT WITH UNIVERSAL LOWER PART FOR VERTICAL AND HORIZONTAL NUMBERING UNITS

CROSS-REFERENCE TO RELATED APPLICATIONS

This patent application is a national phase filing under section 371 of PCT/DE2021/100751, filed Sep. 10, 2021, which claims the priority of German patent application 102020123681.6, filed Sep. 10, 2020, each of which is incorporated herein by reference in its entirety.

TECHNICAL FIELD

The present invention relates to a numbering unit.

BACKGROUND

Numbering units are generally known from EP 0 718 112 A1, DE 295 01 349 U1, DE 44 46 273 A1, DE 10 2006 052 183 A1 and DE 10 2011 100 847 A1, among others.

Such numbering units are used in particular for applying, and in particular printing, a security feature on security documents. In this context, the numbering unit can also be referred to as a numbering printing unit or a printing unit.

In particular, known numbering units are used to apply serial numbers to security documents, in particular banknotes.

In a common arrangement, a numbering unit is arranged on a mounting ring of a numbering machine (printing machine) in a reversible manner, i.e. fixed but can be released again if desired. The numbering unit is located on the outside of the mounting ring, and the type wheels of the unit are arranged on the side facing away from the mounting ring. The mounting ring is generally arranged on a numbering shaft of the numbering machine. Furthermore, the numbering units are located on the outside of the mounting ring.

The sheet to be printed (in particular a sheet of paper with banknotes to be numbered) is then fed to the numbering machine. In the numbering machine, the mounting ring with the numbering units fixed to the outside of the ring rolls on the sheet to be printed, whereby the individual security documents are each provided with a security feature, in particular a serial number, by the individual numbering units. A plurality of mounting rings per numbering shaft and a plurality of numbering units per mounting ring, namely distributed around the circumference of the mounting ring, are generally provided. This is known per se and is not the subject of the present invention.

In general, numbering units also comprise a mechanism that advances the preset serial number by one unit at a desired digit of the number after each printing process, or each time the unit and mounting ring rotate, so that the next document can be printed with a vacant or subsequent serial number. To achieve this, the respective type wheel of the numbering unit is usually rotated by one position. This is known per se and is not the subject of the present invention.

The numbering unit can be divided into two parts and comprise an upper part and a lower part. In particular, the lower part can be fixed to the mounting ring by clamping, but may be detachable again.

The upper part of the numbering unit generally comprises the type wheels and the entire numbering mechanism, which in itself is known in the art. These parts must generally be designed to be quickly removable from the mounting ring, so that the numbering machine does not have to be shut down for too long if the numbering mechanism needs to be replaced, e.g. in the event of defects, wear or a change to the print job.

The lower part of the numbering unit may remain on the mounting ring and only the upper part needs to be removed and replaced, if necessary. This means that the position of the numbering unit on the mounting ring remains unchanged and the clamping between the numbering unit and the mounting ring does not need to be loosened.

On the other hand, removing the lower part of the unit from the mounting ring for the purpose of replacing a numbering unit is disadvantageous and should be avoided, as the positioning of the lower part on the mounting ring has to be carried out with the smallest tolerances. In this respect, replacing the entire numbering unit would take an unacceptable amount of time.

There also exist both vertical and horizontal numbering units. A vertical numbering unit applies a character string to the document that extends in the circumferential direction of the mounting ring. A horizontal numbering unit applies a character string to the document that extends perpendicularly to the circumferential direction of the mounting ring.

The choice of a vertical or horizontal numbering unit depends on the orientation with which a character string must be applied to the document. Many banknotes carry both a vertically and horizontally oriented serial number, so that both of the above-mentioned types or species of numbering units can be employed during the production. Other banknotes only bear vertical or horizontal serial numbers.

When changing the print job, which involves a change between vertical and horizontal (or vice versa) numbering units, so far the entire numbering units including their lower parts must be removed from the mounting ring, and be replaced with complete numbering units of the other type, including their lower parts.

This means that a separate lower part must be purchased for each numbering unit, which increases the investment costs.

Due to the inevitable removal of the lower part from the mounting ring in the event of replacement, the new numbering unit of the other type must always be laboriously repositioned on the mounting ring, even if it could remain in the same position as the previously used unit.

SUMMARY

Embodiments overcome disadvantages known from the prior art.

Other embodiments provide a simple, fast, cost-effective and error-free implementation of the above-mentioned changes between different types of numbering units. [MK1]

Yet other embodiments provide a universal lower part for both an upper part of a vertical numbering unit and an upper part of a horizontal numbering unit.

Further embodiments provide a numbering unit with a universal lower part for vertical and horizontal numbering units, and is in particular a vertical or a horizontal numbering unit.

Some embodiments provide a set comprising a universal lower part, an upper part of a vertical numbering unit, and an upper part of a horizontal numbering unit.

Some embodiments provide an upper part of a vertical numbering unit, and an upper part of a horizontal numbering unit, which each fit on the lower part according to the invention, and may be fixed there.

Some embodiments provide a numbering machine with an aforesaid numbering unit or with an aforesaid set.

Preferably, the lower part according to the invention is designed in its connection portion to the upper part in such a way that it can accommodate both the upper part of a vertical numbering unit and the upper part of a horizontal numbering unit.

Preferably, the upper parts according to the invention are each designed in their connection portion to the lower part in such a way that each upper part, whether that of a vertical or a horizontal numbering unit, fits on the lower part according to the invention, and may be reversibly arranged or fixed there.

This means that only one lower part needs to be provided at a time, which significantly reduces investment costs. The lower parts are variable and can essentially be permanently used. No additional lower parts need to be provided and stored for numbering units of the other type.

If the respective print job allows or provides for it, the respective lower part can remain in its position on the mounting ring when the type is changed, and therefore does not have to be repositioned.

This ensures a simple, fast, cost-effective and error-free implementation of changes between different types of numbering units.

In the following, the aspects of to the invention are discussed further, for which reference is made in part to non-limiting advantageous embodiments and further developments of the invention. The features of advantageous further developments can be implemented individually or in any combination, whereby further advantageous embodiments of the invention are created.

Preferably, the lower part is configured to be fixed firmly, but detachably, to a mounting ring of a numbering machine.

The lower part of the numbering unit is also preferably configured so that it can be clamped to a mounting ring of a numbering machine.

According to another advantageous embodiment, the lower part is configured to remain on the mounting ring of a numbering machine if the upper part is replaced.

In a further advantageous embodiment, the lower part comprises a clamping lever with an opposing clamping hook, through the mutual tensioning of which the lower part can be fixed on a mounting ring of a numbering machine.

Preferably, screws extend through the clamping hook into the lower part.

A particularly preferred embodiment is one in which the lower part is configured to remain on the mounting ring of a numbering machine in the event of a change in the type of numbering unit, namely between a vertical numbering unit and a horizontal numbering unit.

The numbering unit can be a vertical numbering unit, and comprise an upper part that applies to a document to be printed a character string which extends in the circumferential direction of the mounting ring.

Alternatively, the numbering unit can be a horizontal numbering unit, and comprise an upper part that applies to a document to be printed a character string which extends perpendicularly to the circumferential direction of the mounting ring.

Preferably, the respective upper part is designed in its connection portion to the lower part in such a way that it fits onto the lower part and can be reversibly arranged and/or fixed there.

It is advantageous if the universal lower part is designed in its connection portion to the upper part in such a way that it can receive both the upper part of a vertical numbering unit and the upper part of a horizontal numbering unit.

It is further preferred that the lower part is configured to be fixed in a single intended orientation on the mounting ring of a numbering machine, and in this orientation receive both the upper part of a vertical numbering unit and the upper part of a horizontal numbering unit, in order to provide a vertical numbering unit and a horizontal numbering unit, respectively.

A particularly preferred embodiment of the numbering unit according to the invention is one in which the upper part comprises a numbering mechanism.

Preferably, the upper part of the numbering unit comprises type wheels.

When the numbering unit is fixed on the mounting ring of a numbering machine in the intended manner, such type wheels can be arranged side by side as seen in the circumferential direction of the mounting ring. This results in an upper part for a vertical numbering unit, or in such a vertical numbering unit itself.

Alternatively, if the numbering unit is fixed on the mounting ring of a numbering machine in the intended manner, the type wheels can be arranged side by side as seen perpendicularly to the circumferential direction of the mounting ring. This results in an upper part for a horizontal numbering unit, or in such a horizontal numbering unit itself.

A preferred embodiment is one in which a clamping fixation can be established or is established between the upper part and the lower part of the numbering unit.

Particularly preferably, the upper part is configured to be fixed to the lower part, in particular to the lower part being arranged on a mounting ring of a numbering machine, by establishing a clamping connection, and is configured to be removed from the lower part by releasing the clamping connection.

Preferably, the upper part can comprise at least one, preferably two, more preferably two opposing, tensioning levers.

It is advantageous if the tensioning levers extend from the upper part into a recess, an undercut, a groove, or the like, in the lower part, and can thus secure, fix or clamp the upper part on the lower part.

Alternatively or additionally, the lower part may also comprise at least one, preferably two, more preferably two opposing, tensioning levers.

The tensioning levers can preferably extend from the lower part into a recess, an undercut, a groove or the like in the upper part, and thus secure, fix or clamp the upper part on the lower part.

It is advantageous if two tiltable tensioning levers are arranged on the upper part and/or two tiltable tensioning levers are arranged on the lower part, the two levers being arranged diagonally opposite one another.

In a further preferred embodiment, a spring is arranged between a tensioning lever and the respective part, i.e. upper part or lower part, to which the tensioning lever is assigned, which pretensions the tensioning lever and thus prevents the upper part or the lower part, respectively, from being released from the respective opposite part (lower part or upper part), when the tensioning lever is engaged.

Preferably, the tensioning lever can be pivoted away from the opposite part by actuating the tensioning lever against the force of the spring, and the upper part and the lower part can thus be removed from each other.

Preferably, the tensioning lever can pivot into the opposite part when an actuation of the tensioning lever is withdrawn, and can thus fix and/or clamp the upper part to the lower part.

In an advantageous manner, the tensioning levers can each comprise an actuation section for actuation by a user, and a hook section for engagement with the opposite part.

Preferably, a tensioning lever can engage with its hook section in a lateral recess in the lower part.

In a preferred manner, the tensioning levers can be arranged essentially vertically.

In terms of defined positioning, the underside of the upper part can engage with a lug in a central groove of the lower part.

BRIEF DESCRIPTION OF THE DRAWINGS

Supplementary or in addition to the advantageous embodiments and further developments of the teaching already discussed, further embodiments of the invention shown in the drawings to the extent of FIGS. 1A, 1B, 2A and 2B are explained in more detail below. However, the examples discussed with reference to the drawings do not limit the invention to the examples shown. In discussing the embodiments with reference to the drawings, generally preferred embodiments and further developments of the teaching are also shown.

Further developments of the advantageous embodiments described above with features of the embodiments described below, just like further developments of the embodiments described below with features of the embodiments described above, expressly form further advantageous embodiments of the invention, and thus form part of the present disclosure.

With regard to the following explanation of the figures, it should generally be pointed out that reference signs already shown in previous figures and already explained further above in this respect have in part not been reapplied in subsequent figures for reasons of clarity, and/or are in part not explained again with relation to these subsequent figures. For the explanation of such reference signs and the associated technical features, reference is made in full to the respective description of the corresponding preceding figures, in order to avoid repetition.

Figure 1A:
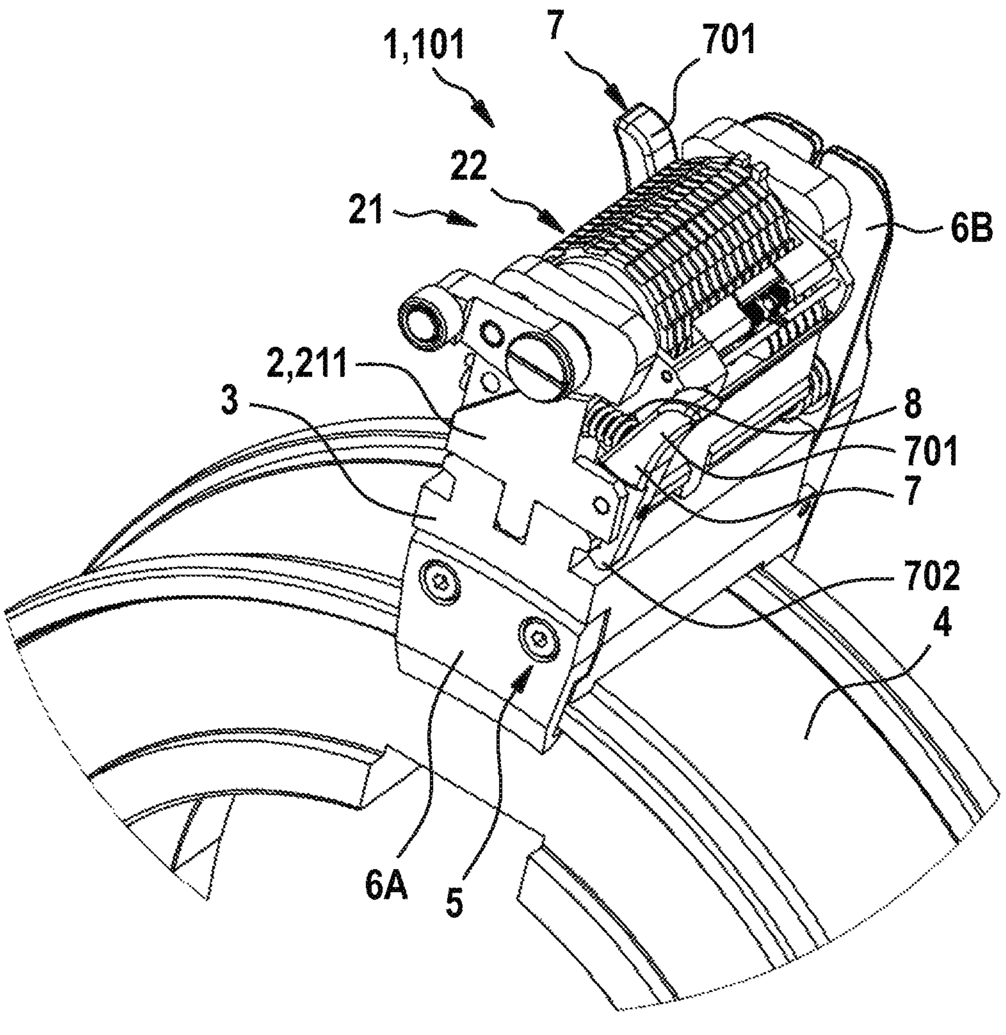
Figure 1B:
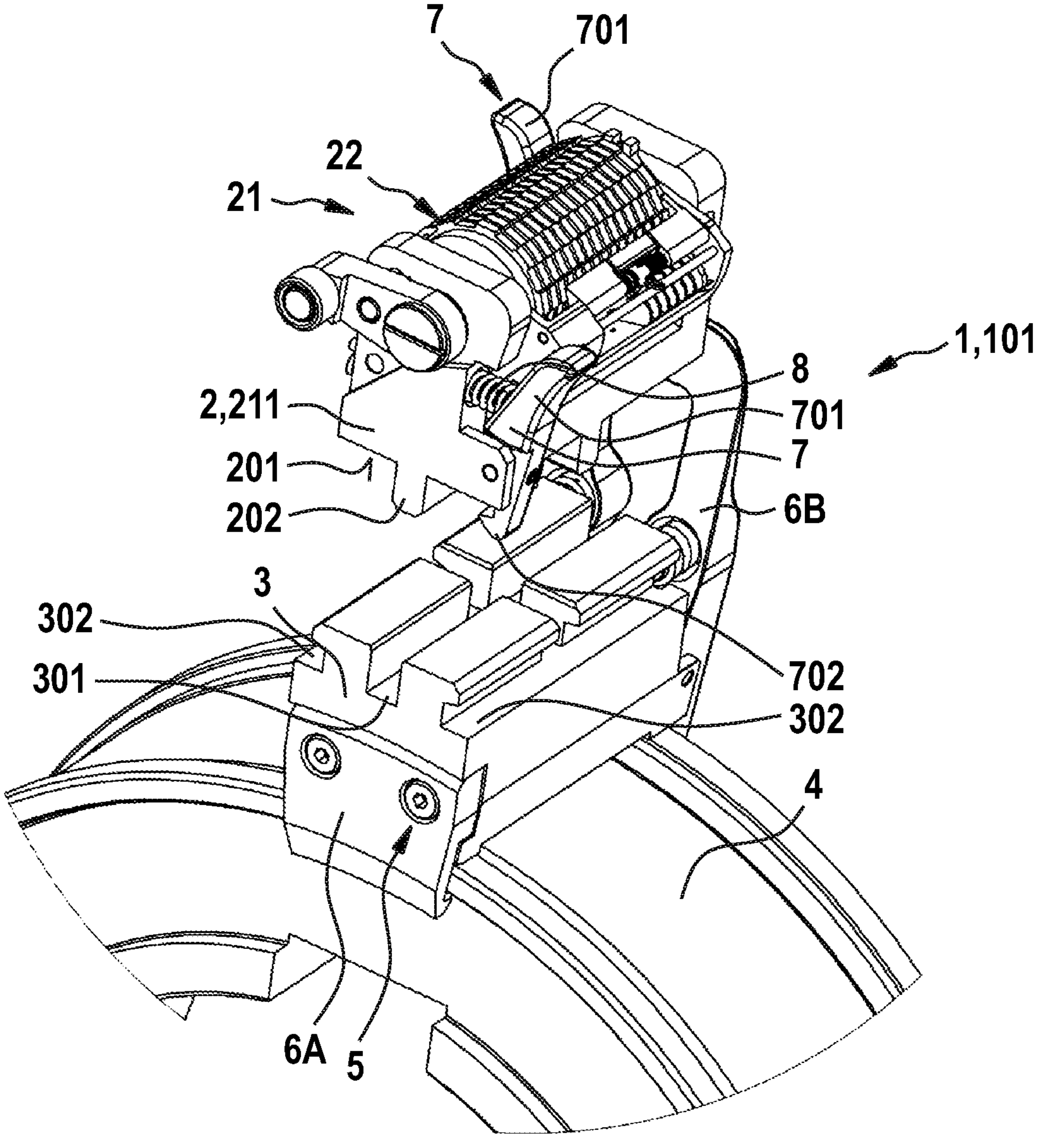
Figure 2A:
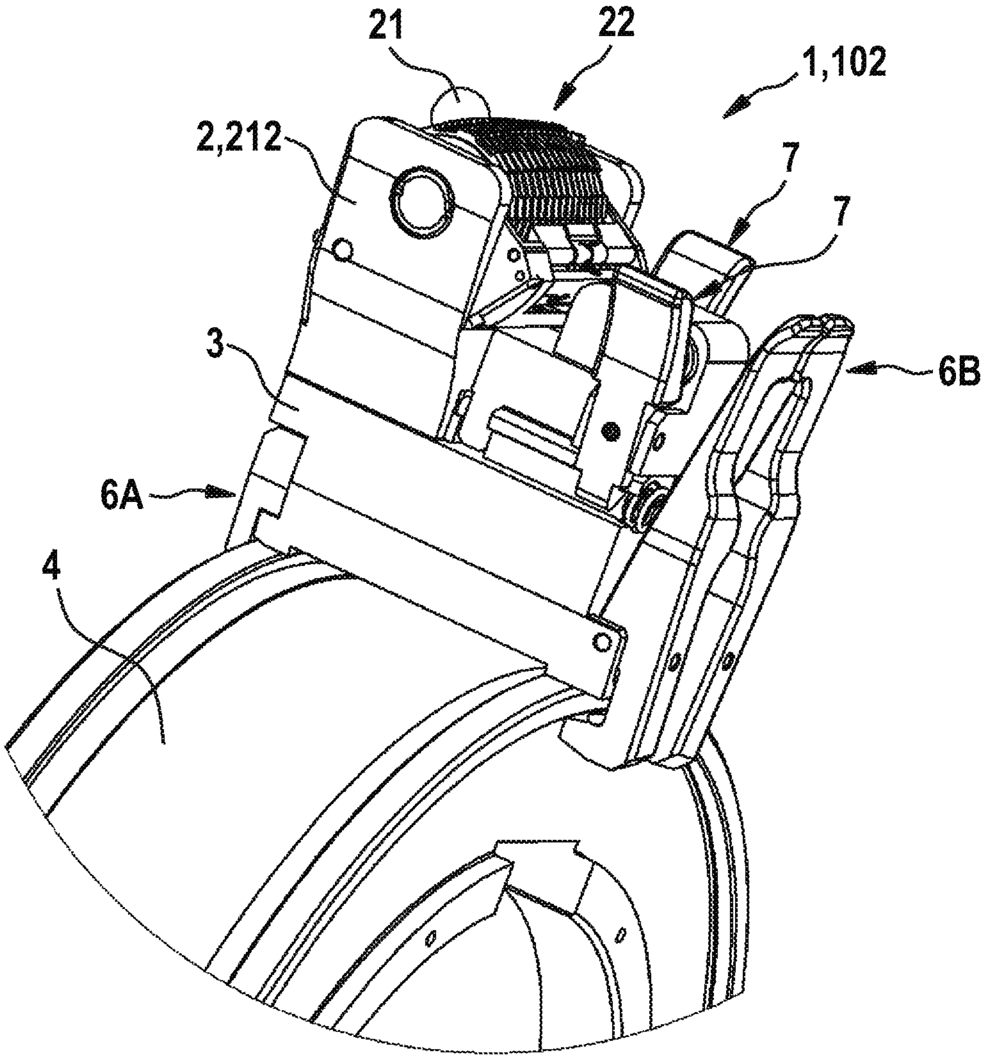
Figure 2B:
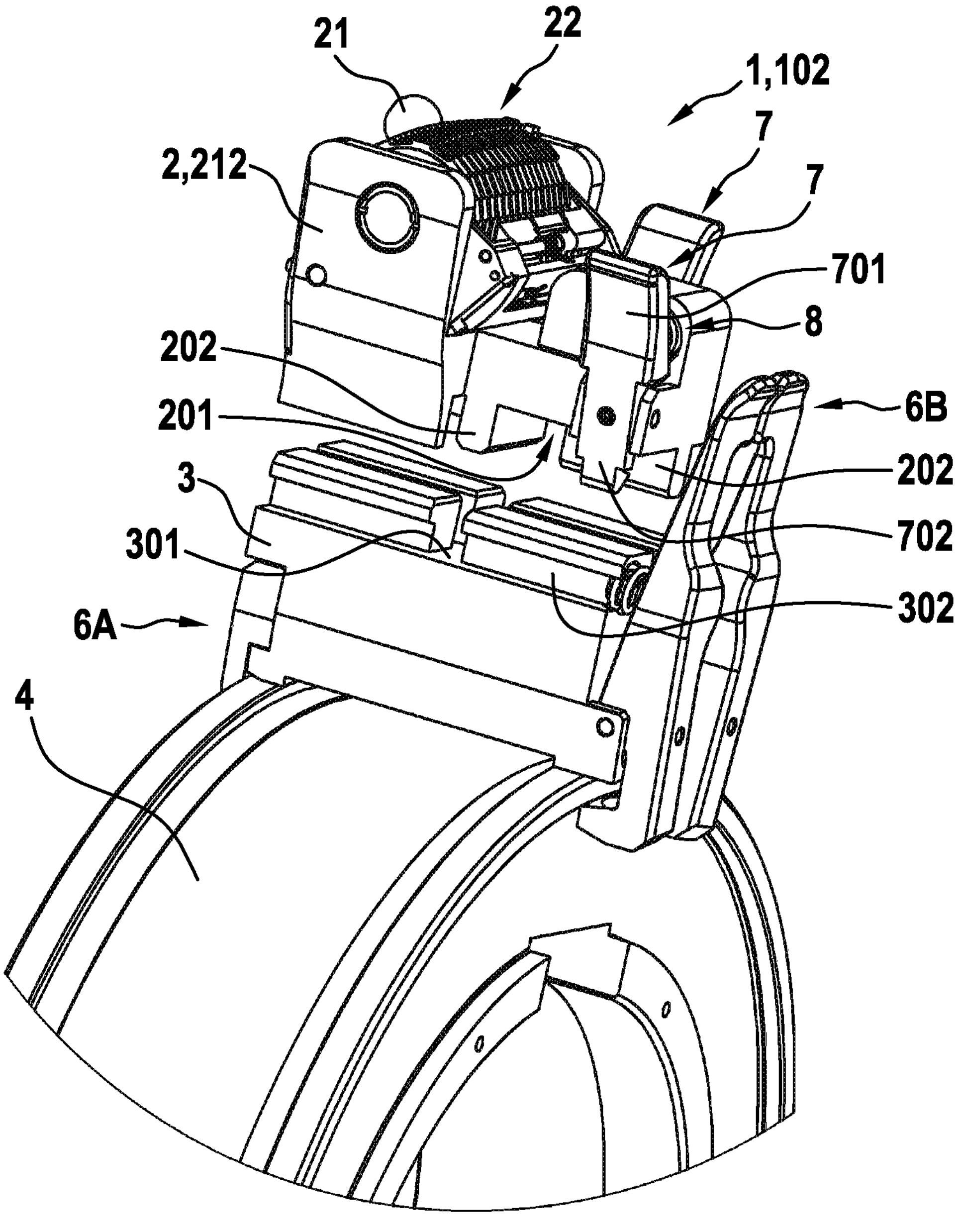

FIG. 1A shows a preferred embodiment of the numbering unit according to the invention, this is a horizontal numbering unit and comprises an upper part and a universal lower part according to the invention;

FIG. 1B shows an exploded view of the embodiment shown in FIG. 1A, with the upper part and lower part of the numbering unit shown at a distance from each other;

FIG. 2 shows a further preferred embodiment of the numbering unit according to the invention, whereby a vertical numbering unit is provided here; and FIG. 2B shows the embodiment of FIG. 2A in an exploded view, with the upper part and lower part of the numbering unit shown at a distance from each other.

DETAILED DESCRIPTION OF ILLUSTRATIVE EMBODIMENTS

FIG. 1A shows a preferred embodiment of a numbering unit 1 according to the invention, comprising an upper part 2 and a lower part 3. The numbering unit 1 here is a horizontal numbering unit 101 and thus comprises a horizontal upper part 211 and a universal lower part 3 according to the invention.

The universal lower part 3 here is, as an example, reversibly fixed to the mounting ring 4 of a numbering machine (not shown). For this purpose, screws 5 extend through the clamping hook 6A on the front side. The clamping hook 6A and the clamping lever 6B are clamped against each other by the opposite clamping lever 6B, whereby the universal lower part 3 is fixed to the mounting ring 4.

In the upper part 2, 211, two tiltable tensioning levers 7 are arranged diagonally opposite each other. The tensioning levers 7 extend essentially vertically and comprise an actuation section 701 at the top for the user and a hook section 702 at the bottom (see FIG. 1B) for engagement in the lower part 3.

At least one spring 8 acts between the upper part 2, 211 and the tensioning levers 7, which pretensions a tensioning lever 7 in a suitable manner.

In a similar way, the clamping lever 6B of the lower part 3, which acts on the mounting ring 4, is pretensioned by its own springs. In this respect, a reversible fixation of the lower part 3 on the mounting ring 4 is also provided here.

The upper part 2, 211 comprises the numbering mechanism 21 with the type wheels 22.

By actuating the tensioning lever 7 against the force of the spring 8, the user can pivot the tensioning lever 7 away from the lower part 3 and thus remove the upper part 2, 211 from the lower part 3 very quickly. Conversely, the upper part 2, 211 can in this way be moved towards the lower part 3 and be arranged or engaged on the latter. By withdrawing the actuating force on the tensioning levers 7, these then pivot into the lower part 3, and thus the upper part 2, 211 is fixed and/or clamped to the lower part 3. This connection between the upper part 2, 211 and the lower part 3 can also be established in just a few seconds.

The type wheels 22 of the upper part 2 are here arranged in such a way that they print on the document to be printed (not shown) a character string which extends perpendicularly to the circumferential direction of the mounting ring 4. Therefore, this is a horizontal numbering unit 101 with a horizontal upper part 211.

FIG. 1B shows the embodiment of FIG. 1A in an exploded view, wherein the upper part 2, 211 and lower part 3 of the numbering unit 1, 101 are shown at a distance from one another.

It can be clearly seen here that the underside 201 of the upper part 2, 211 engages with a lug 202 in a central groove 301 of the lower part 3. The tensioning levers 7, whose lower hook section 702 is clearly visible here, also engage in further suitable lateral recesses 302 or grooves in the lower part 3.

The universal lower part 3 comprises on its upper side a total of four suitably shaped projections, pins or hooks. This forms a total of three grooves 301 or recesses 302 extending in the longitudinal direction, and one in the transverse direction of the lower part 3, in which the upper part 2, 211 or the tensioning levers 7, respectively, can engage in a suitable manner.

Specifically, both the lug 202 and the central groove 301 comprise a corresponding cross shape, i.e. the lug 202 and the central groove 301 each comprise portions oriented perpendicularly to one other. This inevitably leads to an exact positioning of the upper part 2, 211 relative to the lower part 3 when the upper part 2, 211 is advanced to the lower part 3, as there no longer exist any degrees of freedom in the positioning of the upper part 2, 211 perpendicularly to the underside 201 of the upper part 2, 211.

FIG. 2A shows a further preferred embodiment of the numbering unit 1 according to the invention. In contrast to FIGS. 1A and 1B, however, the type wheels 22 of the upper part 2 are here arranged in such a way that they print on the document to be printed (not shown) a character string which extends in the circumferential direction of the mounting ring 4. Therefore, this is a vertical numbering unit 102 with a vertical upper part 212 on a universal lower part 3 according to the invention.

The numbering unit 1, 102 thus comprises an upper part 212 which differs from the upper part 211 of FIGS. 1A and B. However, the upper part 212 is arranged and fixed on the same universal lower part 3 as the upper part 211 of the horizontal numbering unit 101 of FIGS. 1A and B.

Thus, the size and shape of the underside 201 of the upper part 212 of FIG. 2A corresponds exactly to the size and shape of the underside 201 of the upper part 211 of FIGS. 1A and B. As a result, either the upper part 211 of the horizontal numbering unit 101 or the upper part 212 of the vertical numbering unit 102 can be arranged on the same universal lower part 3, and be fixed or clamped there.

FIG. 2B shows the embodiment of FIG. 2A in an exploded view, wherein the upper part 2, 212 and the lower part 3 of the numbering unit 1, 102 are shown at a distance from each other. It becomes particularly clear here that the correlation or fit between the upper part 212 and the universal lower part 3 of the vertical numbering unit 102 corresponds exactly to the correlation or fit between the upper part 211 and the universal lower part 3 of the horizontal numbering unit 101 of FIGS. 1A and B.

The invention claimed is:

1. A numbering unit kit comprising:

a first upper part of a vertical numbering unit;

a second upper part of a horizontal numbering unit; and a universal lower part configured to receive the first upper part in a first configuration and the second upper part in a second configuration, wherein the universal lower part is configured to be arranged on a mounting ring of a numbering machine, wherein the first upper part is configured to apply a first character string to a document that extends in a circumferential direction of the mounting ring, and wherein the second upper part is configured to apply a second character string to a document that extends perpendicularly to the circumferential direction of the mounting ring.

2. The numbering unit kit according to claim 1, wherein the universal lower part is configured to be firmly but detachably fixed to the mounting ring of the numbering machine.

3. The numbering unit kit according to claim 2, wherein the universal lower part is configured to be clamped to the mounting ring of the numbering machine.

4. The numbering unit kit according to claim 2, wherein the universal lower part is configured to remain on the mounting ring of the numbering machine when the first upper part is replaced with the second upper part.

5. The numbering unit kit according to claim 4, wherein the universal lower part is configured to remain on the mounting ring of the numbering machine when the second upper part is replaced with the first upper part.

6. The numbering unit kit according to claim 2, wherein the universal lower part is configured to remain on the mounting ring in case of a change between the vertical numbering unit and the horizontal numbering unit.

7. The numbering unit kit according to claim 1, wherein the first or second upper part comprises a connection portion such that the connection portion fits on the universal lower part and such that the connection portion is fixed thereto.

8. The numbering unit kit according to claim 1, wherein the universal lower part comprises a connecting portion to connect to the first or second upper part such that the connecting portion is configured to receive the first upper part in the first configuration and the second upper part in the second configuration.

9. The numbering unit kit according to claim 1, wherein the universal lower part is configured to be fixed along a single orientation on the mounting ring of the numbering machine, and wherein the universal lower part is configured to receive the first upper part in the first configuration and the second upper part in the second configuration at the single orientation in order to provide the vertical numbering unit and the horizontal numbering unit, respectively.

10. The numbering unit kit according to claim 1, wherein each of the first or second upper part comprises a numbering mechanism.

11. The numbering unit kit according to claim 1, wherein each of the first or second upper part comprises type wheels.

12. The numbering unit kit according to claim 11, wherein the type wheels are arranged side by side as seen in the circumferential direction of the mounting ring of the numbering machine, or wherein the type wheels are arranged side by side as seen perpendicularly to the circumferential direction of the mounting ring of the numbering machine.

13. The numbering unit kit according to claim 1, wherein an underside of each of the first or second upper part is configured to engage with a lug in a central groove of the universal lower part.

14. The numbering unit kit according to claim 1, wherein the universal lower part is arrangeable on the mounting ring of the numbering machine, and wherein each of the first or second upper part is configured to be fixed to the universal lower part by establishing a clamping connection, and is configured to be removed from the universal lower part by releasing the clamping connection.

15. The numbering unit kit according to claim 14, wherein each of the first or second upper part comprises at least two tensioning levers.

16. The numbering unit kit according to claim 15, wherein each of the tensioning levers extends from the first or second upper part into a recess, an undercut, or a groove in the universal lower part, thereby securely fixing or clamping the first or second upper part on the universal lower part.

17. A numbering unit kit comprising:

a first upper part of a vertical numbering unit;

a second upper part of a horizontal numbering unit; and a universal lower part configured to receive the first upper part in a first configuration and the second upper part in a second configuration, wherein the universal lower part is configured to remain on a mounting ring of a numbering machine when the first upper part is replaced with the second upper part or when the second upper part is replaced with the first upper part, and wherein the universal lower part is configured to remain on the mounting ring in case of a change between the vertical numbering unit and the horizontal numbering unit.

18. The numbering unit kit according to claim 17, wherein the universal lower part is configured to be firmly but detachably fixed to the mounting ring of the numbering machine.

19. A numbering unit kit comprising:

a first upper part of a vertical numbering unit;

a second upper part of a horizontal numbering unit; and a universal lower part configured to receive the first upper part in a first configuration and the second upper part in a second configuration, wherein the universal lower part comprises a connecting portion for the first or second upper part, wherein the connecting portion is configured to receive the first upper part in the first configuration and the second upper part in the second configuration.

* * * * *